(12) United States Patent
Bock et al.

(10) Patent No.: US 11,654,838 B2
(45) Date of Patent: May 23, 2023

(54) INTERIOR TRIM

(71) Applicant: FORD GLOBAL TECHNOLOGIES, LLC, Dearborn, MI (US)

(72) Inventors: Andreas Bock, Langenfeld (DE); Robert Wagschal, Ruppichteroth (DE); Bernd Dienhart, Cologne (DE); Phani Vamsi Krishna Anantharaju, Cologne (DE); Thomas Keller, Kreuztal (DE); Maximilian Klein, Düsseldorf (DE); Kilian Vas, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 867 days.

(21) Appl. No.: 16/356,525

(22) Filed: Mar. 18, 2019

(65) Prior Publication Data
US 2019/0283689 A1 Sep. 19, 2019

(30) Foreign Application Priority Data

Mar. 19, 2018 (DE) .......................... 102018204142.3

(51) Int. Cl.
*B60R 13/02* (2006.01)
*H05B 3/14* (2006.01)
*H05B 3/34* (2006.01)

(52) U.S. Cl.
CPC ............ *B60R 13/02* (2013.01); *H05B 3/146* (2013.01); *H05B 3/34* (2013.01);
(Continued)

(58) Field of Classification Search
CPC ............ B60R 13/02; B60R 2013/0287; B60R 13/0212; H05B 3/146; H05B 3/34;
(Continued)

(56) References Cited

U.S. PATENT DOCUMENTS 5,695,847 A * 12/1997 Browne ............... H05K 1/0271
428/389
6,207,077 B1 * 3/2001 Burnell-Jones .......... C08J 5/244
252/301.36

(Continued)

FOREIGN PATENT DOCUMENTS

DE 202013005923 U1 7/2013
DE 102015200272 A1 7/2016
(Continued)

OTHER PUBLICATIONS

English Machine Translation of DE102015200272A1 dated Jul. 14, 2016.
(Continued)

*Primary Examiner* — Helena Kosanovic
*Assistant Examiner* — Yi Hao
(74) *Attorney, Agent, or Firm* — Vichit Chea; Price Heneveld LLP

(57) ABSTRACT

An interior trim for a passenger compartment of a vehicle includes a first carrier, which has an inner side, facing the passenger compartment, and an outer side, directed away from the passenger compartment. A heating element is arranged on the outer side. It is proposed to arrange a matrix and a filler in the first carrier. The filler has a thermal conductivity that is higher than that of the matrix so that heat generated by the heating element can be directed through the filler into the passenger compartment.

11 Claims, 4 Drawing Sheets

(52) U.S. Cl.
CPC .... *B60R 2013/0287* (2013.01); *H05B 2203/013* (2013.01); *H05B 2203/017* (2013.01)

(58) Field of Classification Search
CPC ........ H05B 2203/013; H05B 2203/017; H05B 3/286; H05B 2203/014; B60H 1/2215; B60H 2001/2293
USPC .......................................................... 454/69
See application file for complete search history.

(56) References Cited

U.S. PATENT DOCUMENTS

| | | | | |
|---|---|---|---|---|
| 8,952,296 | B2* | 2/2015 | Hermann | B60R 13/02 |
| | | | | 219/535 |
| 10,370,576 | B2* | 8/2019 | Ellett | B29C 55/12 |
| 10,442,273 | B2* | 10/2019 | Wittkowski | B60H 1/2225 |
| 2004/0094534 | A1* | 5/2004 | Howick | H05B 3/56 |
| | | | | 219/549 |
| 2011/0147357 | A1* | 6/2011 | Bokelmann | H05B 3/34 |
| | | | | 219/202 |
| 2016/0052230 | A1* | 2/2016 | Filipp | B60R 13/02 |
| | | | | 156/276 |
| 2016/0144690 | A1* | 5/2016 | Wittkowski | H05B 3/06 |
| | | | | 219/202 |
| 2017/0361785 | A1* | 12/2017 | Guigner | B60R 13/0861 |
| 2018/0015685 | A1* | 1/2018 | Sugihara | B32B 3/14 |
| 2019/0126853 | A1* | 5/2019 | Cannon | H05B 3/86 |
| 2019/0232886 | A1* | 8/2019 | Okumura | H01Q 1/42 |

FOREIGN PATENT DOCUMENTS

| | | |
|---|---|---|
| JP | 2007106165 A | 4/2007 |
| JP | 2007186025 A | 7/2007 |

OTHER PUBLICATIONS

English Machine Translation of DE202013005923U1 dated Jul. 16, 2013.
English Machine Translation of JP2007106165A dated Apr. 26, 2007.
English Machine Translation of JP2007186025A dated Jul. 26, 2007.

* cited by examiner

INTERIOR TRIM

TECHNICAL FIELD

The document relates to an interior trim for a passenger compartment of a vehicle adapted or configured to direct heat from an outer side thereof toward the passenger compartment.

BACKGROUND

Vehicles that have a heating, ventilation and air-conditioning system (HVAC) are known. These HVAC systems are generally centrally arranged in the dashboard. Provided for this in the dashboard are outlets of ducts of the HVAC system, which allow a temperature-controlled air stream to be emitted from the ducts into the passenger compartment. This air stream is intended to heat the passenger compartment. Further ducts are arranged in the vehicle, intended to carry the air stream to other locations, for example the second or third row of seats, while outlets for the air stream are likewise formed at these locations. Supplying the air stream centrally by means of the HVAC system has the disadvantage that an air stream with low humidity is directed straight onto passengers. Furthermore, uniform heating of the passenger compartment is not possible by the air stream being supplied centrally.

In order to counter the disadvantages of the HVAC system, DE 10 2015 200 272 A1 proposes integrating a heating source in the interior trim. It is proposed for this to print a heating means on a rear side of a layer of the interior trim by means of a silver- or copper-based ink. Electric current is applied to this heating means, so that, as a result of the electrical resistance, heat is produced, and this heat is intended to radiate into the passenger compartment through the layer of the interior trim. One particular disadvantage of this proposal is that the layer of the interior trim has a heat-insulating effect because of its poor heat conducting properties, and therefore the passenger compartment only heats up slowly. Another particular disadvantage is that a large part of the heat built up behind the layer is emitted in the opposite direction, that is to say to the outside. This heat consequently does not contribute to heating up the passenger compartment. This proposal therefore represents a solution that is inefficient in terms of energy. Furthermore, the heat that is introduced into the layer is not quickly given off by the layer, so that aging of the layer of the interior trim is accelerated. As a result, as time passes the layer of the interior trim becomes brittle and changes its original color.

A similarly disadvantageous solution is offered by DE 20 2013 005 923 A1. There it is proposed to provide heating elements consisting of silver ink and for example graphite. The heating element is in this case printed onto a rear side of a layer, so that the same disadvantages as in the case of DE 10 2015 200 272 A1 occur.

In JP 2007106165 it is proposed to provide a door trim with a heat conducting means. The heat conducting means consists of laminated copper foils, which thermally connect an outer surface of the door to the door trim. As a result, solar radiation for example is directed into the passenger compartment through the door trim. This configuration is disadvantageous in particular when summer temperatures prevail, because it cannot be switched off. Furthermore, no active heating element is disclosed. All that is described is the passive heat conducting means for introducing heat from outside the vehicle into the vehicle.

JP2007186025 discloses a mounting structure for a heating system for a vehicle and a fastening method for easily mounting the heating system on interior material of a vehicle. A conductive element is fastened in advance on a base material of a door trim, so that the conductive element passes through the surface and the rear surface of the base material. A heating device is fastened in a recessed portion, which is formed on the inner side. However, the disadvantage of inefficient conduction through a heat-insulating layer is not overcome.

SUMMARY

It is an object of this document to provide an interior trim that has a high thermal conductivity, so that less heat is built up behind the interior trim, and it is directed efficiently into the passenger compartment through the interior trim.

The object is achieved by an interior trim with the features of the following claims.

It should be pointed out that the features and measures individually presented in the description that follows can be combined with one another in any desired, technically meaningful way and show further designs of the interior trim. The description additionally characterizes and specifies the interior trim in particular in conjunction with the figures.

The interior trim is intended for a vehicle. The vehicle may be a motor vehicle with an internal combustion engine or an electric motor, a water vehicle such as a boat or ship, an aviation vehicle such as an aircraft or helicopter or a space vehicle such as a space station or a spaceship or a rocket. The vehicle has a passenger compartment, in which the interior trim is arranged on the inner walls of the vehicle. The interior trim comprises at least one carrier, which has an inner side, directed inwardly into the passenger compartment, and an outer side, directed outwardly. The outer side is directed toward the outer body. A decorative covering, which may for example comprise a leather covering, a textile covering or a plastic covering, may be arranged on the inner side.

Advantageously, a heating element is arranged on the outer side of the carrier, so that the heating element cannot be seen by passengers sitting in the passenger compartment. The heating element is arranged essentially between the body and the carrier. In this case, the heating element is preferably an electrical heating element and is connected to a power supply. The power supply may be a battery and/or an electrical generator.

It is proposed to use the carrier as a matrix for a filler, the filler having a higher thermal conductivity than the material of the matrix. The matrix may have a macroscopic structure, which is filled by the filler. It is for example possible to subdivide the matrix into honeycomb-shaped pockets, which present a beehive-like structure. Circular and/or rectangular and/or other polygonal pockets or combinations of the shapes mentioned are also conceivable. In this case, the pockets may be closed at least on one side or have after filling an opening passing through from the outer side to the inner side. It is alternatively conceivable that the pockets are closed after filling both on the outer side and on the inner side.

In the case of all of the alternatives previously mentioned, the filler may be bonded in the pockets by means of a binder. However, it may also be loosely filled in the pockets. Apart from the macroscopic structure, the matrix can also be configured at a molecular level, in which case extremely small parts such as atoms and/or molecules of the filler are incorporated between or in molecules of the matrix. Also possible is a third alternative, in which the filler formed at the macroscopic level is inserted into the material forming the matrix and remelted, so that the filler retains its macroscopic structure. For example, a powder or granules may be remelted and remain in its or their original form. The filler may be attached by means of 3D printing, casting, foaming, injecting, stuck on as a film, or mechanically secured.

All of the alternatives mentioned have the advantage that an area-covering increase in the thermal conductivity of the carrier is achieved, so that heat generated by the heating element is directed through the carrier into the passenger compartment. The heat therefore does not build up between the body and the carrier and is also not excessively directed into the material of the carrier and stored, so that aging of the carrier is avoided.

An advantageous filler may be boron nitride. Boron nitride has in particular a thermal conductivity of up to 400 W/mK.

The boron nitride may be in the form of a powder or a knifing filler or in a granular form. Preferably, the boron nitride is in a platelet-like granular form with a grain size of about 7 μm. In particular, the boron nitride takes the form of crystals, a suspension, a fluid in binders, a coating, a spray coating, a sintered material, a film with a substrate, granules and/or a boron nitride/oil dispersion. Such a filler containing boron nitride optimally directs the heat into the passenger compartment.

A development of the heating element comprises a heating element in the form of a film. The film that forms the heating element may have a heating resistor, which is preferably formed in the film as a heating wire. Alternatively, the heating resistor may take the form of rolled carbon films, laminated carbon films, a metallic carbon coating, etched heating tracks on a film carrier or printed heating surfaces. The film may comprise a single layer, the heating resistor being stuck and/or printed and/or stamped and/or sprayed on one side of the film. Alternatively conceivable is a two-layered film, in which a heating resistor is arranged between two films. The two films may be laminated on one another by heat fusion and/or adhesive bonding. It is also conceivable to form a bag-like film, in which the heating resistor is arranged, a vacuum subsequently being created in the bag-like film. The heating element is in particular an electrical terminal, by which electrical energy can be led into the heating resistor, so that the latter heats up and gives off its heat into the surroundings, that is to say through the carrier into the passenger compartment. The described embodiments of the heating element can be applied flexibly to a wide variety of interior trims.

Advantageously, the heating element may be laminated onto the outer side of the carrier. Alternatively, it may also be stuck on or surrounded by the carrier in the region of the outer side. In this case, it is preferably encapsulated. Especially distinguished as particularly advantageous for joining the heating element to the carrier is an injection molding process. The heating element is consequently located on the side of the carrier that is facing the vehicle body. A solid connection between the carrier and the heating element, even under high ambient temperatures, is ensured by the described types of fastening of the heating element.

If the carrier is made of plastic, it can be advantageously brought into a wide variety of forms. Similarly, a connection to the heating element can be realized in a clever and low-cost way. The plastic of the carrier may preferably contain polypropylene such as PP-TD20, acrylonitrile-butadiene-styrene such as ABS or polyamide such as PA. The matrix in particular comprises such a plastic. Alternatively, recycled materials, natural, biological or organic materials may be used.

Apart from the first carrier described above, a second carrier can be provided in the interior trim. The second carrier may be arranged on the first carrier. The heating element is then preferably arranged between the two carriers. Alternatively, the heating element may be contained in one of the two carriers. The two carriers surround the heating element in the manner of a sandwich. The two carriers are preferably connected to one another by an injection molding process. The second carrier ensures complete encapsulation of the heating element, so that the latter is protected by the second carrier.

Advantageously, the second carrier also comprises plastic. The plastic is preferably polypropylene such as PP-TD20, acrylonitrile-butadiene-styrene such as ABS and/or polyamide such as PA. In this case, the second carrier does not have a matrix with a heat-conducting filler, and consequently also does not have increased thermal conductivity. The second carrier preferably thermally insulates the heating element toward the outside, so that heat from the heating element is directed through the first carrier and enters the passenger compartment.

In particular, the second carrier is supplemented by a layer of polyurethane. Furthermore, the second carrier may be reinforced by fiber mats and have a paper backing. This produces a composite of different functional materials, which improve both the insulating effect and the strength of the second carrier. The polyurethane may have a porous or non-porous structure, which intensifies the insulating effect. The paper backing serves for maintaining the structure and for improving the stiffness.

The fiber mats ensure a great flexibility and at the same time strength of the carrier. Consequently, the second carrier prepares the entire interior trim for extreme environmental influences.

The terminal of the heating element may be connected to a cable harness of the vehicle, this is to say to an electrical line of the same by which the heating element is supplied with electrical energy. It is consequently unnecessary for a separate line to be laid for the heating element. The energy supply can be available on demand, for which purpose corresponding switching elements are provided.

Advantageously, the interior trim may be arranged in the region of the roof, on the headliner, and/or on a lateral interior trim. In this case, doors and pillars in the interior may be provided with the interior trim. In addition, the rear sides of the seats for the occupants may be provided with the interior trim. This ensures an optimum distribution of heat sources in the passenger compartment.

BRIEF DESCRIPTION OF THE DRAWING FIGURES

Further advantageous refinements of the interior trim are disclosed in the following description of the figures, in which.

DETAILED DESCRIPTION

In the various figures, the same parts are always provided with the same designations, for which reason they are also only described once.

Figure 1:
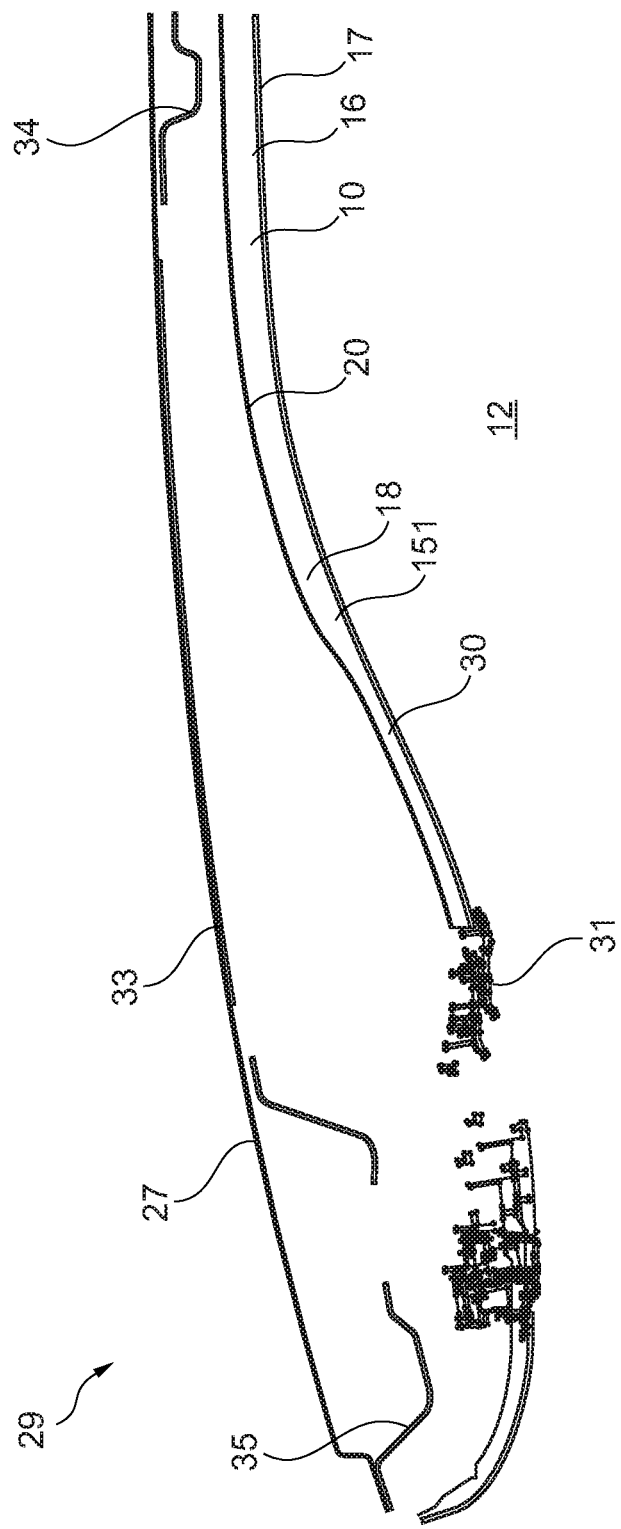
FIG. 1 shows a section through a roof of a vehicle with the interior trim.

In FIG. 1, a section through a roof 29 is shown. The roof 29 has a roof panel 27. The roof panel 27 is arranged on the outside of the roof 29 and represents a part of a body of a vehicle. The vehicle may be a motor vehicle. The roof 29 provides an outer delimitation for a passenger compartment 12 of the vehicle.

Arranged on the side of the roof 29 that is facing the passenger compartment 12 is a headliner 30, which comprises an interior trim 10. Formed between the interior trim 10 and the roof panel 27 is a cavity, in which a noise insulation 33 in the form of a mat is attached on the inner side of the roof panel 27. The noise insulation 33 may be adhesively attached to the roof panel 27. Also arranged on the inner side of the roof panel 27 along with the noise insulation 33 is a central stiffening rib 34, which stiffens the roof panel 27. Arranged on the side of the noise insulation 33 opposite from the central stiffening rib 34 is a further front structure 35, produced from sheet metal.

The headliner 30 forms the surface of the roof 29 that is visible from the passenger compartment 12 and arranged in which is a roof console 31, for example for lights, a display screen, a radio and/or a compartment.

The interior trim 10 comprises a first carrier 151 and a heating element 20. The heating element 20 is arranged on the outer side 18 of the carrier 151. Attached on the inner side 16 of the first carrier 151, which is oriented toward the passenger compartment 12, is a decorative trim 17, which may for example be produced from fabric and/or leather and/or plastic. The designations 10, 151, 20, 18, 16 and 17 only schematically show the elements denoted thereby in FIG. 1, while the elements for this can be clearly seen in FIG. 2. The first carrier 151 has a varying thickness along its direction of extent. Similarly, the cross section of the roof 29 has a varying thickness along the direction of extent.

Figure 2:
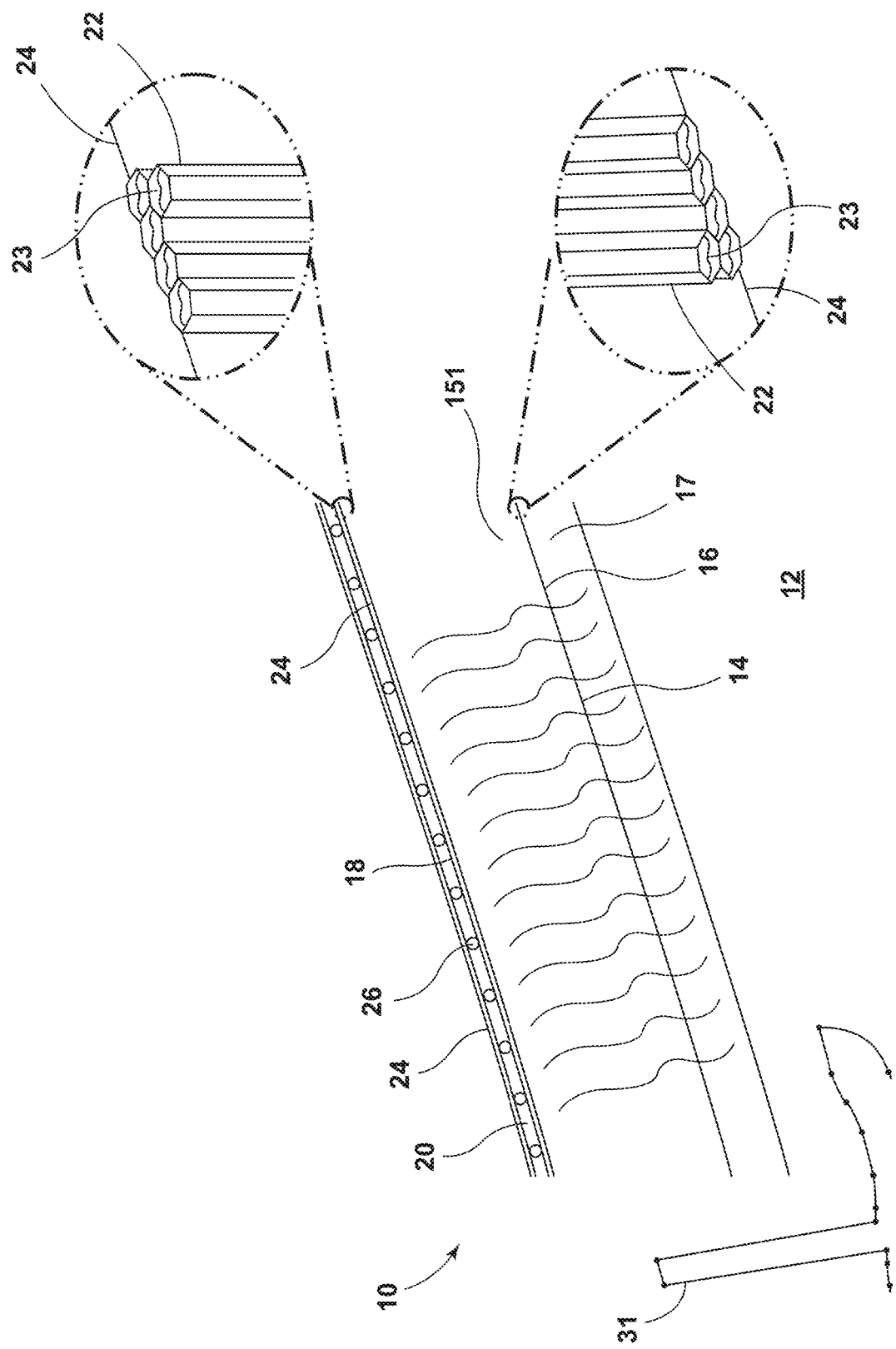
FIG. 2 shows an enlarged detail of the interior trim at the roof.

An enlarged detail of the interior trim 10 is depicted in FIG. 2. The first carrier 151 is provided on the inner side 16 with the decorative trim 17. Attached on the outer side 18 is the heating element 20. The heating element 20 may be fastened onto the outer side 18 by a heat fusion process and/or an adhesive bonding process and/or an injection molding process. The heating element 20 is preferably laminated on the outer side 18.

The heating element 20 is made up of a heating resistor 26, preferably consisting of a heating wire and two films 24. The heating resistor 26 is laminated between the two films 24 in the manner of a sandwich. The two-dimensionally formed heating element 20 is arranged in an area-covering manner on the outer side 18.

The first carrier 151 comprises a matrix 22, which preferably consists of plastic. In this case, the plastic comprises at least polypropylene such as PP-TD20, acrylonitrile-butadiene-styrene (ABS) and/or polyamide (PA). The matrix 22 may have pockets filled with a filler 23. The pockets are preferably formed in a honeycomb-like manner. The filler 23 may be attached by means of 3D printing, casting, foaming, injecting, stuck on as a film, or mechanically secured.

The filler 23 may also be integrated in the molecular structure of the matrix 22, so that no pockets have to be provided, while atoms or molecules of the filler 23 are inserted between or in molecules of the matrix material. Alternatively, a filler in powder form or in granular form can be remelted from the material of the matrix 22, the powdered or granular filler 23 retaining its form. As a result, the thermal conductivity density of the carrier 151 provided with the filler 23 is increased, so that an absolute increase in the thermal conductivity is achieved.

The filler 23 comprises boron nitride, which has a thermal conductivity of up to 400 W/mK. In particular, the boron nitride takes the form of a powder with crystals, a suspension, a fluid in binders, a coating, a spray coating, a sintered material, a film with a substrate, granules and/or a boron nitride/oil dispersion.

The boron nitride may be introduced into the pockets of the matrix in the form of a powder or a knifing filler or in a granular form. The boron nitride in powder form or granular form can be remelted. Preferably, the boron nitride is in a platelet-like granular form with a grain size of about 7 μm.

A heat transfer 14, which is produced by the heating element 20, is directed through the first carrier 151 prepared with the filler 23 into the passenger compartment 12 and heats it.

Figure 3:
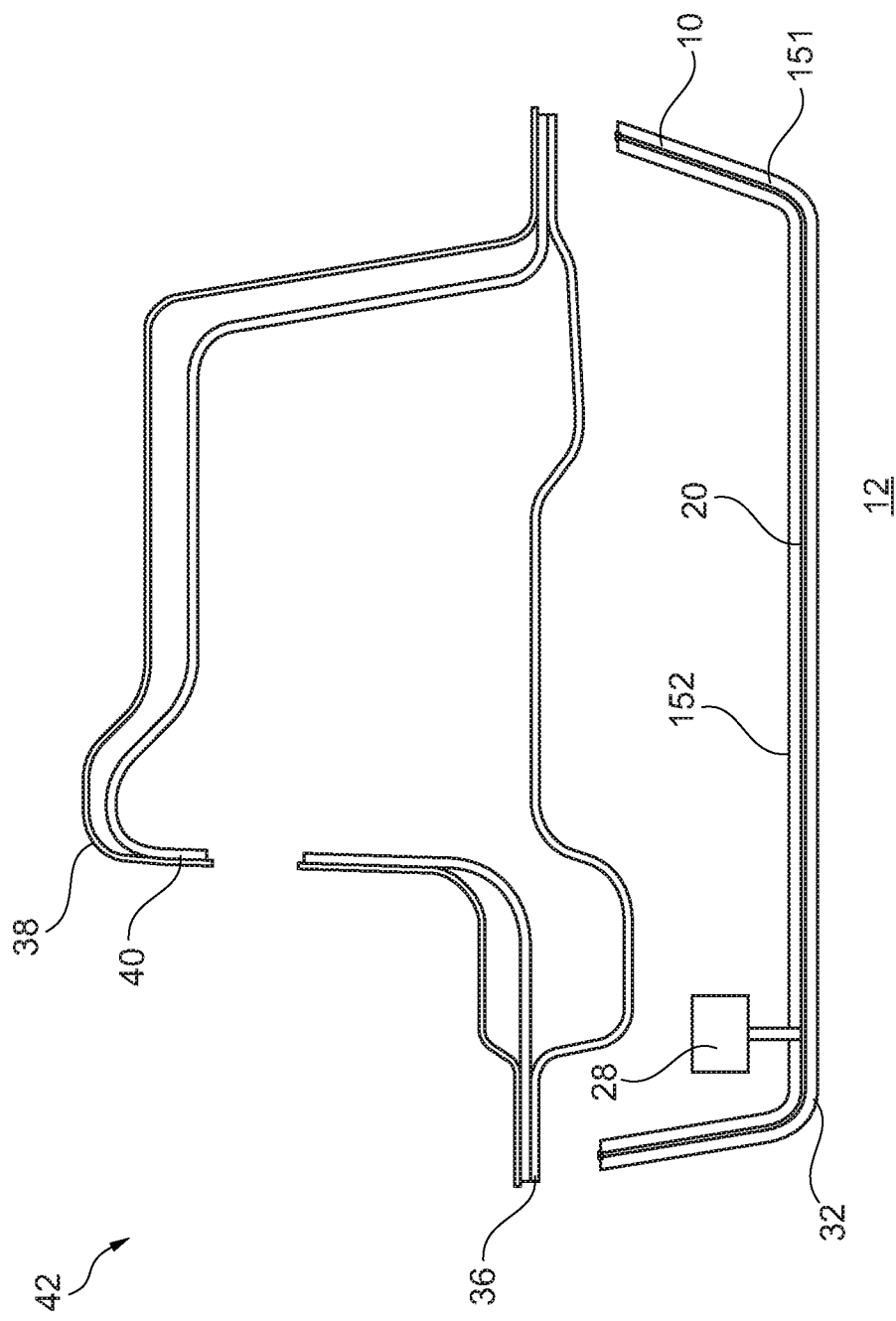
FIG. 3 shows a section through a pillar of a vehicle with the interior trim.

In FIG. 3, a cross section through a pillar 42 of a motor vehicle is depicted. The pillar 42 is made up of an outer pillar panel 38, which is outwardly directed. An inner pillar panel 36, which is inwardly directed toward the passenger compartment 12, forms with the outer pillar panel 38 a cavity in which a pillar reinforcing plate 40 is arranged on the inner side of the outer pillar panel 38 in such a way as to follow its shape.

Arranged on the inner pillar panel 36, on the side directed toward the passenger compartment 12, is a lateral interior trim 32. This lateral interior trim 32 corresponds essentially to the interior trim 10. The lateral interior trim 32 comprises a first carrier 151 and a second carrier 152, the heating element 20 being arranged between the two carriers 151, 152.

The heating element 20 has an electrical terminal 28, which is led from the heating element 20 through the second carrier 152 into a space between the lateral interior trim 32 and the inner pillar panel 36. The terminal 28 is connected to a cable harness (not shown) of the vehicle, that is to say to an electrical line of the same, so that the heating element 20 is supplied with electrical energy on demand.

Figure 4:
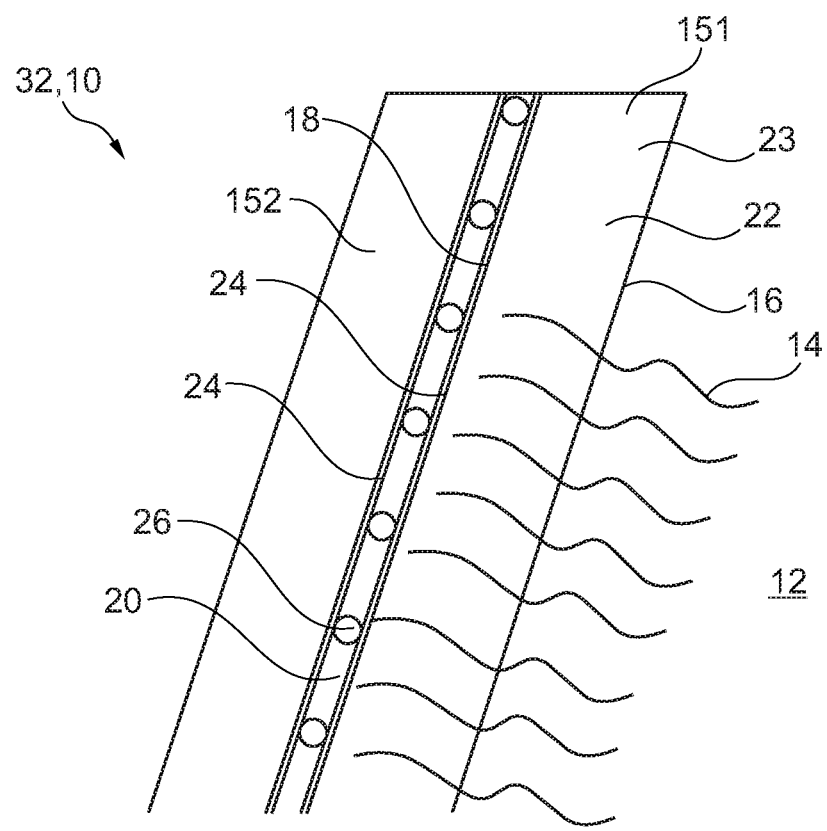
FIG. 4 shows an enlarged detail of the interior trim on the pillar.

An enlarged detail from the lateral interior trim 32 is depicted in FIG. 4. The interior trim 32 encloses with the first carrier 151 and the second carrier 152 the heating element 20. The heating element 20 is made up in a way similar to in FIG. 2 by two films 24 and a heating resistor 26, the heating resistor 26 preferably being a heating wire.

The first carrier 151 is similarly made up of a matrix 22, which is filled with the filler 23. The heat transfer 14 produced by the heating element 20 is directed through the filler 23 into the passenger compartment 12.

The second carrier 152 is made up of plastic. In this case, the plastic comprises at least one of the substances from the group: polypropylene such as PP-TD20, acrylonitrile-butadiene-styrene such as ABS and/or polyamide such as PA. In particular, the second carrier 152 has a layer of polyurethane. The second carrier 152 also comprises at least one fiber mat for reinforcement. In addition, a paper backing is arranged on the outside of the second carrier 152 as an outermost layer. Of course, the second layer 152 may also be provided in the case of the exemplary embodiment shown in FIGS. 1 and 2, while the exemplary embodiment as shown in FIGS. 3 and 4 could just comprise the first carrier 151 while dispensing with the second carrier 152.

What is claimed:

1. An interior trim for a passenger compartment of a vehicle, comprising:
a first carrier, said first carrier having an inner side that faces the passenger compartment, and an outer side that is directed away from the passenger compartment, wherein the first carrier has a variable thickness defined by a unitary matrix; and
a heating element arranged on the outer side, wherein the first carrier comprises:
the matrix, wherein the matrix is divisible into polygonal pockets, wherein each polygonal pocket is bounded by the outer side and the inner side such that the polygonal pockets have a variable thickness between the outer side and the inner side that corresponds to the variable thickness of the first carrier; and
a filler, the filler having a thermal conductivity that is higher than that of the matrix whereby heat generated by the heating element is directed through the filler into the passenger compartment, wherein the interior trim is arranged on a headliner, wherein the filler contains a boron nitride, which has a thermal conductivity of up to 400 W/mK; and
the first carrier comprises a first plastic, wherein said first plastic is selected from a first group consisting of polypropylene, PP-TD20, acrylonitrile-butadiene-styrene (ABS), a polyamide (PA) and combinations thereof, and the matrix comprises a second plastic, wherein a second carrier is arranged on the heating element and the heating element is arranged between the first carrier and the second carrier, wherein the second carrier comprises a third plastic, where said third plastic is selected from a second group consisting of polypropylene, PP-TD20, acrylonitrile-butadiene-styrene (ABS), a polyamide (PA) and combinations thereof, wherein the second carrier contains polyurethane, which is reinforced by fiber mats and has a paper backing.

2. The interior trim as claimed in claim 1, wherein the heating element is a film, which has a heating resistor.

3. The interior trim as claimed in claim 2, wherein said heating resistor is a heating wire.

4. The interior trim as claimed in claim 2, wherein the heating element is laminated on the outer side of the first carrier.

5. The interior trim as claimed in claim 2, wherein the heating element is carried on the outer side of the first carrier.

6. The interior trim as claimed in claim 2, wherein the heating element is encapsulated by the outer side of said first carrier.

7. The interior trim as claimed in claim 1, wherein the heating element has a terminal adapted for connection to a cable harness of the vehicle.

8. The interior trim as claimed in claim 1, wherein a thickness of the first carrier varies along an extending direction.

9. The interior trim as claimed in claim 8, wherein the thickness of the first carrier varies along a cross-sectional direction.

10. An interior trim for a passenger compartment of a vehicle, comprising:
a first carrier, said first carrier having an inner side that faces the passenger compartment, and an outer side that is directed away from the passenger compartment, wherein the first carrier has a variable thickness defined by a unitary matrix; and
a heating element arranged on the outer side, wherein the heating element is a film, which has a heating resistor, wherein the first carrier comprises:
the matrix, wherein the matrix is divisible into polygonal pockets, wherein each polygonal pocket is bounded by the outer side and the inner side such that the polygonal pockets have a variable thickness between the outer side and the inner side that corresponds to the variable thickness of the first carrier;
a filler, the filler having a thermal conductivity that is higher than that of the matrix whereby heat generated by the heating element is directed through the filler into the passenger compartment, wherein the filler contains a boron nitride, which has a thermal conductivity of up to 400 W/mK; and
the first carrier comprises a first plastic, wherein said first plastic is selected from a first group consisting of polypropylene, PP-TD20, acrylonitrile-butadiene-styrene (ABS), a polyamide (PA) and combinations thereof, and the matrix comprises a second plastic, wherein a second carrier is arranged on the heating element and the heating element is arranged between the first carrier and the second carrier, wherein the second carrier comprises a third plastic, where said third plastic is selected from a second group consisting of polypropylene, PP-TD20, acrylonitrile-butadiene-styrene (ABS), a polyamide (PA) and combinations thereof, wherein the second carrier contains polyurethane, which is reinforced by fiber mats and has a paper backing.

11. The interior trim as claimed in claim 10, wherein the interior trim is arranged on lateral surface of the passenger compartment.

* * * * *